United States Patent
Tuttle et al.

(10) Patent No.: US 10,719,426 B2
(45) Date of Patent: Jul. 21, 2020

(54) METHODS AND SYSTEMS FOR TESTING WEB APPLICATIONS

(71) Applicant: VELOCITY TECHNOLOGY SOLUTIONS, INC., New York, NY (US)

(72) Inventors: Travis Tuttle, New York, NY (US); John Waite, New York, NY (US); Ping-Haur Jen, New York, NY (US); Pritesh Gaikwad, New York, NY (US); Chen-Feng Yang, New York, NY (US)

(73) Assignee: Velocity Technology Solutions, Inc., New York, NY (US)

(*) Notice: Subject to any disclaimer, the term of this patent is extended or adjusted under 35 U.S.C. 154(b) by 48 days.

(21) Appl. No.: 15/940,177

(22) Filed: Mar. 29, 2018

(65) Prior Publication Data

US 2018/0285246 A1    Oct. 4, 2018

Related U.S. Application Data

(60) Provisional application No. 62/479,911, filed on Mar. 31, 2017.

(51) Int. Cl.
*G06F 11/36* (2006.01)
*H04L 12/911* (2013.01)
(Continued)

(52) U.S. Cl.
CPC ........ *G06F 11/3664* (2013.01); *G06F 11/302* (2013.01); *G06F 11/3414* (2013.01);
(Continued)

(58) Field of Classification Search
CPC .............. G06F 11/302; G06F 11/3414; G06F 11/3634; G06F 11/3684; G06F 11/3688;
(Continued)

(56) References Cited

U.S. PATENT DOCUMENTS

| | | | |
|---|---|---|---|
| 6,907,546 B1* | 6/2005 | Haswell | G06F 11/3684 714/38.11 |
| 7,028,225 B2* | 4/2006 | Maso | G06F 11/3438 702/186 |

(Continued)

OTHER PUBLICATIONS

Andrews, Anneliese A., Jeff Offutt, and Roger T. Alexander. "Testing web applications by modeling with FSMs." Software & Systems Modeling 4.3 (2005): pp. 326-345. (Year: 2005).*

(Continued)

*Primary Examiner* — Satish Rampuria
(74) *Attorney, Agent, or Firm* — Dentons US LLP

(57) ABSTRACT

A system and method for utilizing metadata of a client computer in form of transactions and/or software operations (e.g., actions) in an enterprise system hosted by a host entity, such as in a cloud environment for testing the software operations is disclosed. The host entity stores metadata (e.g., response time, delay, processing time, usage) about the transactions in a database for the client computer system's actions. The host entity then uses the stored metadata to automatically generate a test script based on actual user interactions with the software operations of the enterprise resource planning system for specific data range and environment in order to test functionality of a plurality of software operations in the enterprise resource planning systems being operated by users of the client computers.

20 Claims, 12 Drawing Sheets

(51) Int. Cl.
*G06F 16/28* (2019.01)
*G06F 11/34* (2006.01)
*G06F 11/30* (2006.01)
*H04L 29/06* (2006.01)
*G06Q 10/06* (2012.01)
*H04L 29/08* (2006.01)
*G06F 11/32* (2006.01)

(52) U.S. Cl.
CPC ...... *G06F 11/3684* (2013.01); *G06F 11/3688* (2013.01); *G06F 16/285* (2019.01); *H04L 47/82* (2013.01); *G06F 11/32* (2013.01); *G06F 2201/865* (2013.01); *G06F 2201/87* (2013.01); *G06Q 10/0631* (2013.01); *H04L 67/02* (2013.01); *H04L 67/42* (2013.01)

(58) Field of Classification Search
CPC ............ G06F 11/32; G06F 2201/865; G06F 2201/87; H04L 47/82; H04L 67/02; H04L 67/42; G06Q 10/0631
USPC .................................................. 717/124–167
See application file for complete search history.

(56) References Cited

U.S. PATENT DOCUMENTS

| | | | | |
|---|---|---|---|---|
| 7,231,606 | B2* | 6/2007 | Miller | H04L 43/50 |
| | | | | 702/186 |
| 7,272,822 | B1* | 9/2007 | Riggins | G06F 9/451 |
| | | | | 717/124 |
| 7,681,079 | B2* | 3/2010 | Xu | G06F 11/2294 |
| | | | | 714/25 |
| 9,419,884 | B1* | 8/2016 | Li | H04L 43/50 |
| 2002/0078144 | A1* | 6/2002 | Lamkin | G06F 21/10 |
| | | | | 709/203 |
| 2005/0246716 | A1* | 11/2005 | Smith | G06F 9/465 |
| | | | | 719/315 |
| 2006/0265600 | A1 | 11/2006 | Mimura et al. | |
| 2007/0150599 | A1 | 6/2007 | Neogi et al. | |
| 2007/0168971 | A1* | 7/2007 | Royzen | G06F 11/3688 |
| | | | | 717/124 |
| 2010/0082321 | A1 | 4/2010 | Cherkasova et al. | |
| 2012/0131593 | A1 | 5/2012 | DePetro | |
| 2013/0305223 | A1* | 11/2013 | Eade | G06F 8/20 |
| | | | | 717/125 |

OTHER PUBLICATIONS

Di Lucca, Giuseppe A., et al. "Testing web applications." International Conference on Software Maintenance, 2002. Proceedings . . . IEEE, 2002.pp. 310-319 (Year: 2002).*

Ricca, Filippo, and Paolo Tonella. "Analysis and testing of web applications." Proceedings of the 23rd international conference on Software engineering. IEEE Computer Society, 2001.pp. 25-34 (Year: 2001).*

Benedikt, Michael, Juliana Freire, and Patrice Godefroid. "VeriWeb: Automatically testing dynamic web sites." In Proceedings of 11th International World Wide Web Conference (WWW'2002. 2002.pp. 1-15 (Year: 2002).*

Di Lucca, Giuseppe A., et al. "Testing web applications." International Conference on Software Maintenance, 2002. Proceedings . . . IEEE, 2002.pp. 310-319 (Year: 2002).*

Amalfitano, Domenico, et al. "Using GUI ripping for automated testing of Android applications." Proceedings of the 27th IEEE/ACM International Conference on Automated Software Engineering. ACM, 2012.pp. 258-261 (Year: 2012).*

International Search Report and Written Opinion of the International Searching Authority, dated Jun. 19, 2018, in corresponding International Application No. PCT/US2018/025053, 7 pages.

* cited by examiner

FIG. 4

METHODS AND SYSTEMS FOR TESTING WEB APPLICATIONS

CROSS-REFERENCE TO RELATED APPLICATIONS

This application claims priority to U.S. Provisional Application Ser. No. 62/479,911, filed on Mar. 31, 2017, entitled "Methods and Systems for Managing Testing Web Applications," all of which are incorporated by reference in their entirety.

TECHNICAL FIELD

This application relates generally to systems, apparatus, and methods for software and web application testing, and more particularly relates to testing tools for enterprise resource planning (ERP) software systems.

BACKGROUND

ERP software systems play a crucial role in the operation of many modern businesses and include a wide variety of complex software systems. Such ERP systems may comprise hundreds or thousands of modules that are interrelated. Implementing the complex software system often requires custom programming of numerous software modules to combine software from vendors with the existing systems of a corporation or other entity. Some companies may run, manage, and service their own ERP software systems, such as those from Oracle® or Infor Lawson® systems. Other companies may outsource the services to a third party, who hosts the hardware and software and manages these ERP systems for the companies.

A third party may test a software application in the ERP system to identify software bugs, glitches, and issues within the software application. The test may be performed after an application build or upgrade, and the test may identify features or functions that are not performing according to a desired specification. Conventional testing techniques, such as stress tests, may be employed to test an application in an ERP system by simulating situations during which multiple users are simultaneously utilizing the ERP system software. The stress tests provide analytical information regarding the stability of the application being tested. Therefore, it is highly desirable for the stress tests to be performed on applications that are generally utilized by a plurality of users (e.g., databases, webservers, etc.). If those applications are not subjected to the stress tests, then they may fail at a crucial point, e.g., if too many users are attempting to use the application, then a failure may result in irreparable downtime for the application. In order to perform the stress test, an administrator may interview users of the application to ascertain common usage and then manually generate test scripts based upon the usage conveyed by those users and assumptions based on those interviews. However, this process often results in a test script that does not accurately capture user interactions, as users may overemphasize or deemphasize certain actions. Additionally, this manual process of generating test scripts can be arduous and slow, plaguing project management teams with every application patch, upgrade, or migration.

SUMMARY

Disclosed herein are systems and methods capable of addressing the above-described shortcomings and may also provide any number of additional or alternative benefits and advantages. As described herein, systems and methods comprise an enterprise resource planning testing tool to replicate actual user interactions within the enterprise resource planning system and apply a test script on a target environment by removing guesswork of which applications and functionality are being utilized. With a one-click test script generator, the systems and methods can identify complete application functionality utilized in any source production environment, thereby eliminating a lengthy discovery phase of determining critical applications, a slow process of manually creating a test scripts, and recording of hypothetical use cases, consequently making planning, identifying, and test script creation easier and more efficient.

Systems, apparatuses, methods, and computer program products of the present disclosure perform testing of web applications by utilizing datasets (such as field level data records) collected by a host entity of a plurality of web applications/software operations in enterprise resource planning systems being operated by a plurality of client companies. When a web application is integrated with a host entity and key field data collection is enabled, a host entity collects the field level data executed in the web application as well as key field values for one or more forms and/or records of employees. The systems and methods are then able to use the field level data collected by the host entity and automatically generate a test script based on actual user interactions with the enterprise resource planning system. The automatic generation of a test script transforms the functional and stress testing process by replacing a labor intensive validation of application functionality with automated, data-backed test scripts that save time and consume fewer resources for the host entity and client companies when making a change to the web application environment.

In one embodiment, a system and method utilizes community information that a client company performs in form of transactions and/or software operations (e.g., actions) in an enterprise system hosted by a host entity, such as in a cloud environment. The host entity stores datasets, which may include field level data (such as personal identifiable data of employees operating on modules of client computer system software operations and/or web applications) as well as metadata (e.g., response time, delay, processing time, usage) about the transactions in a database for the client company's actions and the actions of other client companies. The host entity then uses the stored datasets comprising the field level data to automatically generate a test script based on actual user interactions with the ERP system for specific data range and environment in order to test functionality of a plurality of software operations in the ERP systems being operated by users of a plurality of client companies. In some instances, the host entity may use the field level data as well the metadata to automatically generate a test script based on actual user interactions with the ERP system for specific data range and environment in order to test functionality of a plurality of software operations in the ERP systems being operated by users of a plurality of client companies.

A host entity's system comprises at least two parts: a web interface and a testing agent. In some embodiments, the web interface is used by users of a host entity to generate a test script, by selecting an environment and date range as source environment using the web interface for the test script. In addition to generating the test script, users of a host entity can view results from previous test runs and modify field values for subsequent runs on the web interface. In some embodiments, a test server then generates transactional requests by using information from the test script and form definitions. Once the test server generate the transactional requests, the test server performs a functional test by submitting the transactional request to a target system and sends the response for each request back to a host entity. In some embodiments, a testing agent replicates the stress and interaction on each target system from a source environment, enabling a full rehearsal by replaying actual user activities and providing an accurate data comparison to verify and validate performance of all necessary application functionality. For example, a testing agent is capable of utilizing JMeter, a stress testing tool, to simulate stress on the target client system by increasing a number of transactional requests within a certain time period. With the functional and stress testing capability of a host entity as described herein, the host entity is able to test both application functionalities as well as ensuring the infrastructure is configured to handle the stress during the most critical processing period.

In one embodiment, a computer-implemented method may include receiving, by a server over a communication network from a client computer system, a first transmission comprising datasets corresponding to at least a plurality of software operations of a first application in an enterprise resource planning system being operated by the client computer system where each of the software operations is linked to at least one dataset. The server is further configured to categorize data relating to each software operation to one of a plurality of categories. The computer-implemented method may further include generating, by a server, a test script using one or more data fields selected for a second application from the datasets for a defined time-period where one or more instructions are defined in the test script and the one or more instructions are loaded into a computer-readable memory. The computer-implemented method may further include executing, by a server, the test script to test the second application according to the instructions defined in the test script. The executing of the test script comprises retrieving, by the server, the plurality of software operations of the first application during the defined time-period for the one or more selected data fields, and performing, by the server, the plurality of software operations of the first application during the defined time-period for the one or more selected data fields. The computer-implemented method may further include transmitting, by the server over the communication network to the client computer system, a second transmission comprising information for display of test performance of the plurality of the software operations of the second application based on the datasets corresponding to the first application in the enterprise resource planning system.

In another embodiment, a system may include a client computer system and a server coupled to each other via a communication network. The server is configured to receive over the communication network from the client computer system, a first transmission comprising datasets corresponding to at least a plurality of software operations of a first application in an enterprise resource planning system being operated by the client computer system where each of the software operations is linked to at least one dataset. The server is further configured to categorize data relating to each software operation to one of a plurality of categories. The server is further configured to generate a test script using one or more data fields selected for a second application from the datasets for a defined time-period where one or more instructions are defined in the test script and the one or more instructions are loaded into a computer-readable memory. The server is further configured to execute the test script to test the second application according to the instructions defined in the test script. The executing of the test script by the server comprises retrieving the plurality of software operations of the first application during the defined time-period for the one or more selected data fields and performing the plurality of software operations of the first application during the defined time-period for the one or more selected data fields. The server is further configured to transmit over the communication network to the client computer system, a second transmission comprising information for display of test performance of the plurality of the software operations of the second application based on the datasets corresponding to the first application in the enterprise resource planning system.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 4 shows a graphical user interface showing a dashboard, according to an exemplary embodiment.

DETAILED DESCRIPTION

Figure 1:
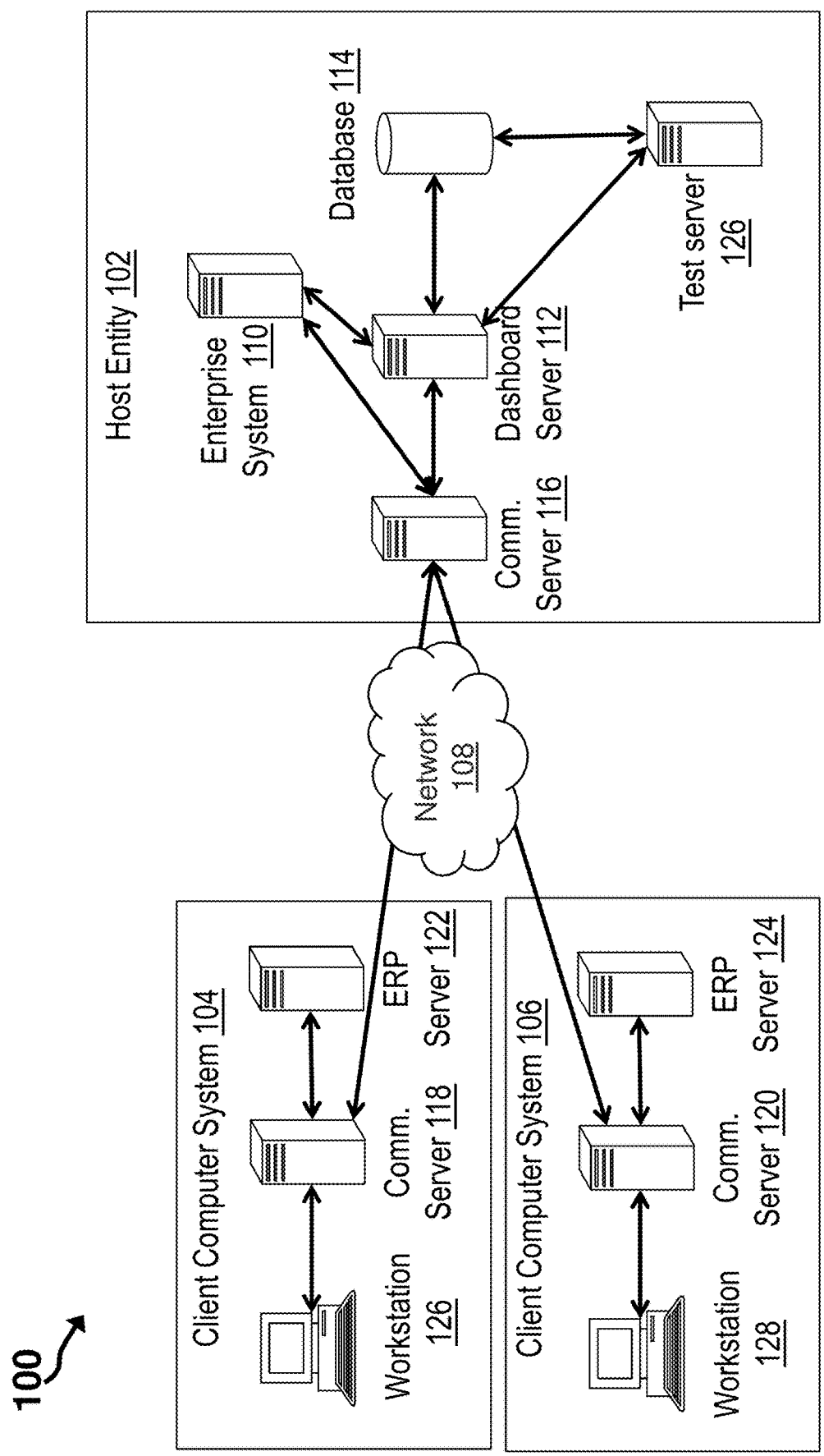
FIG. 1 shows components of a system for testing web applications, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

When performing a stress test for a new application, an enhanced or updated application, operating system, or computer system, the systems and methods herein are able to capture datasets comprising field level data and metadata of each transaction with an enterprise resource planning system in order to generate a script that is based upon the actual transactions rather than assumptions of use. The automatic generation of a test script transforms the functional and stress testing process by replacing a labor intensive validation of application functionality with automated, data-backed test scripts that save time and consume fewer resources for the host entity and client companies when making a change to the web application environment. As disclosed herein, systems and methods can use the datasets of a client computer in form of field level data, transactions, and/or software operations (e.g., actions) in an enterprise resource planning system hosted by a host entity, such as in a cloud environment for testing the software operations. The host entity stores datasets, which may further include the field level data (comprising the personal identifiable of employees of client computer systems operating on one or more modules of the client computer system software operations and/or web applications) as well as the metadata (e.g., response time, delay, processing time, usage) about the transactions in a database for the client computer system's actions. The host entity then uses the stored datasets to automatically generate a test script based on actual user interactions with the software operations of the enterprise resource planning system for specific data range and environment in order to test functionality of a plurality of software operations in the enterprise resource planning systems being operated by users of the client computers.

FIG. 1 shows components of a system 100 for testing web applications, according to an exemplary embodiment. The system 100 may include a host entity 102, a client computer system 104, and a client computer system 106. The host entity 102, the client computer system 104, and the client computer system 106 and their components are connected to each other through a network 108. The examples of the network 108 may include, but are not limited to, private or public LAN, WLAN, MAN, WAN, and the Internet. The network 108 may include both wired and wireless communications according to one or more standards and/or via one or more transport mediums. The communication over the network 108 may be performed in accordance with various communication protocols such as Transmission Control Protocol and Internet Protocol (TCP/IP), User Datagram Protocol (UDP), and IEEE communication protocols. In one example, the network 108 may include wireless communications according to Bluetooth specification sets, or another standard or proprietary wireless communication protocol. In another example, the network 108 may also include communications over a cellular network, including, e.g. a GSM (Global System for Mobile Communications), CDMA (Code Division Multiple Access), EDGE (Enhanced Data for Global Evolution) network.

A host entity 102 can host an enterprise system 110 for various client companies, collectively referred to as a community. The host entity 102 can host the enterprise system 110 on a cloud platform. The host entity 102 may provide service level agreements (SLAs) that the client computer system 104, 106 cannot obtain themselves. The host entity 102 can provide real-time information on a dashboard regarding the operation of the enterprise system 110, including a number of tickets, response time, who is logging on, etc. The client computer system 104, 106 may use the enterprise system 110 to perform a plurality of transactions and/or software operations, where each transaction and/or software operation is performed by a client computer system 104, 106 representative using hardware and/or software hosted by the host entity 102. Each transaction and/or software operation (e.g., adding an invoice, submitting a time record, submitting a batch job) is not intended to be limited to a financial transaction and/or software operation, but rather a measurable or discrete task, project, and/or action in the enterprise system 110. Because the host entity 102 collects data from the client companies 104, 106 using the enterprise system 110, the host entity 102 can also provide information to the client computer system 104, 106 about the performance of the client computer system's web applications. For example, the host entity 102 may perform one or more test regarding the software operations and/or the web applications of the client companies 104, 106 and provide feedback to the client companies 104, 106 on test results. The client computer system 104, 106 may then adjust their processes or their software based upon the test result feedback provided by the host entity 102.

A host entity 102 hosts an enterprise system 110 for a plurality of client companies 104, 106. The enterprise system 110 may be any computing device comprising a processor and non-transitory machine-readable storage medium and capable of performing the various tasks and processes described herein during execution. Non-limiting examples of the enterprise system 110 may include a desktop computer, a server computer, a laptop computer, a tablet computer, and the like. For ease of explanation, FIG. 1 shows a single server functioning as the enterprise system 110, but it is intended that the enterprise system 110 may include one or more servers, databases, and/or cloud environments used to host the system on behalf of the client computer system 104, 106.

The host entity 102 may have a dashboard server 112 communicatively coupled to the enterprise system 110 for harvesting data and presenting the data to a communication server for display to a client computer system 104, 106. In some embodiments, the dashboard server 112 may be communicatively coupled to the enterprise system 110 for harvesting data and presenting the data to a test server 126 that is configured to perform one or more tests using the data in order to test functionality of a plurality of software operations and web applications being operated by users of client computer system 104, 106.

Non-limiting examples of the dashboard server 112 may include a desktop computer, a server computer, a laptop computer, a tablet computer, and the like. In some embodiments, the dashboard server 112 may include a Web interface that runs Web pages from an Ethernet board and includes an HTTP protocol interpreter, a PLC back plane driver, a TCP/IP stack, and an Ethernet board kernel. The Web interface provides access to the host entity 102. Using this interface of the dashboard server 112, an administrator of the host entity 102 may retrieve all pertinent data regarding the operation of the client computer system 104, 106 to perform one or more tests using the data in order to test functionality of a plurality of software operations and web applications being operated by users of client computer system 104, 106.

Although one server is shown for the dashboard server 112, it is intended that the functionality may be performed by one or more servers and databases. The dashboard server 112 may include a plurality of monitoring tools or applications to assist in managing a client computer system's information. The dashboard server 112 may also be communicatively coupled to a database 114. The database 114 can store records having datasets gathered by the dashboard server 112 and/or other components of the host entity 102. In some embodiments, a test server 126 may be communicatively coupled to the database 114 for harvesting data to perform one or more tests in order to test functionality of a plurality of software operations and web applications being operated by users of the client computer system 104, 106.

A database 114 stores datasets comprising field level data. In some embodiments, the field level data is obtained from all operational and personal identifiable data associated with the client computer system 104, 106. In some embodiments, the field level data is obtained from data associated with the client computer system 104, 106, which may include metadata. The metadata may include information about the client computer system 104, 106 transactions and/or software operations and the data about the underlying transaction and/or software operation. The metadata may include data about one or more employees if the client computer system 104, 106, data about one or more software and web applications of the client computer system 104, 106, and one or more forms that are being accessed by users and/or employees of the client computer system 104, 106. In one example, the database 114 may store one or more forms corresponding to employee records containing data fields such as a first name, a last name, an employee ID, a start date, a job title and so on. In another example, the database 114 may store one or more forms corresponding to benefit module (BN), human resources module (HR), personnel actions module (PA), payroll module (PR) accessed by users and/or employees of the client computer system 104, 106. During operation, a request may be made to the database 114 to obtain records containing forms and employee details from the database 114.

In some embodiments, the database 114 stores the datasets, which may include data about underlying transaction and/or software operation. For example, a client computer system in a healthcare industry, such as a hospital, may order a suture tray with all of the tools and items needed to provide stitches to a patient. The database 114 may further store information about how many suture trays are ordered for the sake of comparing the ordering trends with other hospitals. The database 114 may further store information about a particular patient that needed stitches or the reason the stitches were applied. In the exemplary embodiment, the database 114 may store any sensitive information.

The database 114 may be non-transitory machine-readable storage media for storing datasets records as discussed above. The term "computer readable medium" or "computer usable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as disk drive. Volatile media includes dynamic memory, such as system memory. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

The host entity 102 also has a communication server 116 (e.g., a web server) to transmit data to and from the client companies 104, 106. Non-limiting examples of the communication server 116 may include a desktop computer, a server computer, a laptop computer, a tablet computer, and the like. The host entity's communication server 116 may present a webpage to a communication server 118, 120 (e.g., web server) of the client computer system/device 104, 106. The host entity's communication server 116 may populate the webpage with data obtained from a communicatively coupled dashboard server 112, and the host entity's communication server 116 may transmit the webpage for display at the client computer system 104, 106.

Although two client companies 104, 106 are shown, it is intended that the host entity 102 may host a community of any number of client companies 104, 106. Also, although the exemplary embodiment recites the use of an enterprise system 110, it is intended that any platform or software that is consistent with the scope of this disclosure may be used. In this exemplary embodiment, each client computer system 104, 106 may have an enterprise resource planning (ERP) server 122, 124. Although one ERP server 122, 124 is shown for each client computer system/device 104, 106, it is intended that the functionality may be performed by one or more servers and databases. The ERP server 122, 124 may be communicatively coupled to the communication server 118, 120 of the client computer system/device 104, 106 to transmit data to and from the communication server 116 of the host entity 102, which is coupled to the host entity's enterprise system 110. These servers may communicate over a network 108, such as the internet.

The client computer system 104, 106 has a workstation 126, 128 and/or other computing/computer device (e.g., desktop computer, laptop computer, tablet computer, mobile device, cellular phone, smartphone, personal data assistant) that can communicate through the client computer system's communication server 118, 120 with the host entity 102. The host entity 102 can generate a webpage using the dashboard server 112 and data from the database 114 to provide the community information to the workstation 126, 128 at the client entity. This information is generated by the host entity 102 and configured for display on a graphical user interface (e.g., web browser) of the workstation 126, 128 of the client computer system 104, 106.

During operation, a dashboard server 112 may communicate with a database 114 storing the datasets comprising the field level data. The field level data may include personal identifying data of employees of the client computer system 104, 106 operating on one or more modules of the client computer system software operations and/or web applications. The datasets may further include metadata, which may include one or more employee records and forms accessed by employees of the client computer system 104, 106 on one or more modules of the client computer system software operations and/or web applications. The dash board server 112 may send a request to the database 114 to obtain the datasets comprising data corresponding to one or more employee records and form details. In some embodiments, the dash board server 112 may send a specific request to the database 114 to obtain one or more field values from a plurality of field values in the one or more employee records and forms. The dash board server 112 may select the one or more field values from a plurality of field values in the one or more employee records and forms based one or more set of rules. The one or more set of rules may be defined based on form definition. For example, in a Google email form, there may be two fields: a user name field and a password field. The dash board server 112 will determine definition for the log-in form for Google email stored in a database 114 and based on the definition for the log-in form for Google email, the dash board server 112 will select the one or more field values from the two fields of Google email form. The form definition may be defined by administrators of the client computer system 104, 106 and/or the host entity 102.

In some embodiments, the dash board server 112 then reconstruct a dataset (for example, a first dataset) required to simulate client computer system employee interaction with the web applications of the ERP server 122, 124 of the client computer system 104, 106 based on the one or more field values in the one or more employee records and forms accessed by employees. The dash board server 112 will then generate a test script based on the dataset and/or the metadata reconstructed and/or obtained from the database 114. The test script may be a programmed code that automates a test case generated by reconstructing one or more fields for a selected dataset within the metadata by calling subroutines or application programming interfaces (APIs) exported by test automation frameworks (TAF). The TAF may provide the backend support for executing the test script, including the infrastructure for creating processes and tracking and controlling remote test setups. In an example, a test case may include complex logic in which multiple processes, tools, and ERP systems are utilized by the users of the client computer system 104, 106. The test case may include parallel and sequential processes, with each process performing one or more testing functions.

In some embodiments, the dash board server 112 will select a product/application software category for which a test has to be performed. In addition to the product/application category, in some embodiments, the dash board server 112 will also select an environment and date range as source environment for the selected product/application software category in order to obtain a selected dataset for a selected environment with a defined time-period for generation of the test script for testing the selected product/application software category. For example, the ERP server 122, 124 may have multiple environments such as a production environment configured to do production request and a task environment configured to do other requests. In another example, a single software product/application (such as People Soft) that has to be tested may be operated by the client computer system 104, 106 in different countries. Each country will then represent a different environment for the software application. In such a case, the dash board server 112 after selecting People Soft as a product/application category, the dash board server 112 will then select, for example, USA zone as an environment for the selected product/application category and any date range for the selected product/application category for generation of the test script.

A test server 126 communicatively coupled to the dash board server 112 may then receive the test script from the dash board server 112. In some embodiments, the dash board server 112 may automatically transmit the test script to the test server 126 upon generating the test script. In some embodiments, the dash board server 112 may transmit the test script to the test server 126 upon receiving a request from the test server 126. In some embodiments, the dash board server 112 may transmit the test script to the test server 126 upon receiving a request from an administrator of the host entity 126. The test server 126 then generates transactional requests by using data from the test script and/or form definitions. Upon the generation of the transactional requests, the test server 126 performs a functional test to test web application of the client computer system 104, 106 by submitting the transactional requests.

In some embodiments, the test server 126 is also capable of utilizing performance test tools or systems (or software) enabling various scenario of using a web application of the client computer system 104, 106 to be simulated to deduce therefrom statistical data reflecting its performance. Among these tools, the JMeter tool can be mentioned, a software produced by the Foundation Apache. The JMeter tool enables performance tests of ERP computing web applications of the client computer system 104, 106 to be performed according to different protocols such as HTTP/HTTPS, SMTP, etc. To do so, JMeter tool simulates the load of a plurality of users of a target ERP computing application of the client computer system 104, 106, and subsequently measures a number of performance metrics describing the behavior of the ERP computing web application responsive to this load, especially response times representative of the client computer system employee experience. Upon the completion of the test, the test server 126 may then present test results over the communication network 108 to the client computer system 104.

In alternative embodiments of the present disclosure, the host entity 102 can obtain information from a client computer system 104, 106 to provide insight. The system 100 can be configured so that the ERP server 122, 124 can extract information and provide it to the dashboard server 112 so that the host entity 102 can provide information about trends, efficiencies, and performance.

By gathering transactional datasets comprising at least metadata from a community of enterprise system 110 client companies 104, 106, the system 100 can provide comparative analysis of system 100 and user efficiency. Furthermore, by gathering metadata about the community's systems themselves (e.g., versions, patches), it is possible to provide additional comparative analysis for system and user performance across different versions. Further, by adding additional metadata about system changes and system events (i.e., monitors), additional comparative analysis can be provided.

Examples of how a host entity 102 can use datasets to compare the client computer system 104, 106 with others in the community include, but are not limited to, an ability to: (1) analyze on-line transactional usage for patterns/comparisons by system/transaction/function; (2) analyze batch system usage for patterns/comparisons by system/transaction/function; (3) analyze system performance metrics for patterns/comparisons by system/transaction/function; (4) analyze system level (version/upgrade/cyclical/patch) for patterns/comparisons by system/transaction/function; (5) analyze ad-hoc query usage/efficiency (and impact on overall system performance); (6) analyze user logins for patterns/comparisons by system/transaction/function; (7) analyze user session duration/habits for patterns/comparisons by system/transaction/function; (8) analyze user efficiencies for patterns/comparisons by system/transaction/function; (9) identify anomalous user behavior (i.e., users logging in from home @2:30 am); and (10) identify anomalous transaction and/or software operation behavior (i.e., daemon process that updates Accounts Payable Vendor terms before scheduled check runs and changes back after check run).

In one embodiment, an internal control system can harvest metadata about the actual system itself, including all source code, objects, screens, configurations, database, etc. This system would allow for: (1) change control analysis; (2) configuration comparisons with community; (3) all performance metrics above sliced by any changes to system; and (4) system delta(s) from delivered "gold code."

Figure 2:
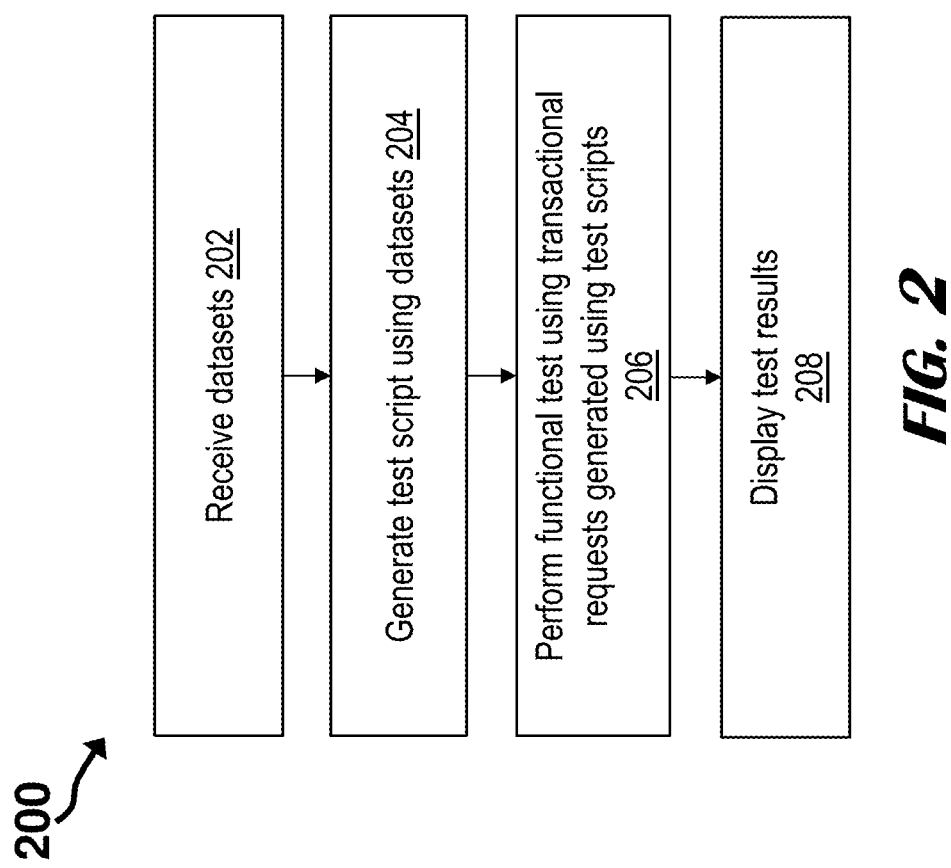
FIG. 2 shows execution of a method for testing web applications, according to an exemplary embodiment.

FIG. 2 shows execution of a method 200 for testing web applications, according to an exemplary embodiment. The exemplary method 200 shown in FIG. 2 comprises execution steps 202, 204, 206, and 208. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In step 202, a server may receive over a communication network from a client computer system, transmittance of datasets comprising at least field level data as well as metadata of a plurality of software operations of a first application (for example, payroll web application version one) in an enterprise resource planning system being operated by the client computer system. Each of the software operations may be linked to at least one dataset permitting the server to categorize data relating to each software operation to one of a plurality of categories.

In some implementations, the datasets of the plurality of software operations may further include personal identifying information of employees of a company operating the client computing system. In some implementations, the datasets of the plurality of software operations may further include personal identifying information of employees of the company operating the client computing system and also the details corresponding to actions relating to each software operation performed by the employees of the company operating the client computing system. In some implementations, the datasets of the plurality of software operations of the first application in the enterprise resource planning system being operated by the client computer system comprises the field level data generated by one or more enterprise resource planning system servers of the client computer system.

In step 204, a server may generate a test script using the datasets for a second application (for example, a new version or release of a payroll web application or an entirely new application) to be tested. The server may generate the test script for testing the second application by selecting one or more data fields from a plurality of data fields in the datasets corresponding to the first application in the enterprise resource planning system. Upon selecting the one or more data fields, the server may retrieve values corresponding to each of the one or more data fields. The server may then use the one or more data fields and their corresponding values in order to generate the test script for testing the second application.

In some embodiments, the server may generate the test script for testing the second application by selecting the one or more data fields in the datasets corresponding to the first application for a defined time-period. In some embodiments, the server may generate the test script for testing the second application by selecting the one or more data fields in the datasets corresponding to the first application for a specific environment in the defined time-period. For example, an application may operate in multiple countries and each of the country may represent a different environment of operation for the application. In some embodiments, upon the generation of the test script, the server define one or more instructions in the test script. The server then loads the one or more instructions into a computer-readable memory. The server may also download the test script to a volatile memory of a database.

The server may generate the test script for a variety of purposes. For example, a generated test script may be used by the server within a software testing environment (e.g., supported by a software test server) to perform functional testing on a client computing system using the test script and/or to perform regression testing on the client computing system using the test script. The test script may include sections associated with various different test cases using the metadata corresponding to the first application to be performed on the client computing system.

In step 206, a server execute the test script to test the second application according to the instructions defined in the test script. During the execution of the test script, the server may generate a request, and transmit the request to a database to retrieve the plurality of software operations of the first application during the defined time-period for the one or more selected data fields. The database on receiving the request from the server may retrieve the plurality of software operations of the first application during the defined time-period for the one or more selected data fields, and later transmit the plurality of software operations of the first application during the defined time-period for the one or more selected data fields to the server. The server upon receiving the plurality of software operations of the first application during the defined time-period for the one or more selected data fields from the database perform the plurality of software operations of the first application during the defined time-period for the one or more selected data fields.

In some embodiments, during the execution of the test script, the server may generate a transactional request using information and/or data associated to the test script. The transactional request may include recreating one or more requests of employees of the client computer system based on the selected one or more data fields in the metadata corresponding to the first application for the specific environment in the defined time-period. Upon the generation of the transactional request, the server perform a functional test of the second application by executing the transactional request.

In some embodiments, the server is also capable of utilizing JMeter (a stress testing tool) to simulate client computer system employee stress on the second application of the client computer to be tested by increasing number of transactional requests within a certain time period, and then perform a functional test by the server of the second application by executing the total number of the transactional requests.

In step 208, a server transmit a second transmission over a communication network to a client computer system. The second transmission may include information for display of test performance of the plurality of the software operations of the second application based on the datasets corresponding to the first application in the enterprise resource planning system. Users of the client computer system may then view the test performance results of the plurality of the software operations of the second application on a graphical user interface (GUI) of the client computer system, and modify one or more software operations for subsequent operation of the second application based on the test results. Users of the client computer system may also compare the test performance results of the plurality of the software operations of the second application with results from previous test runs, and modify one or more software operations for subsequent operation of the second application based on the comparison results.

Figure 3:
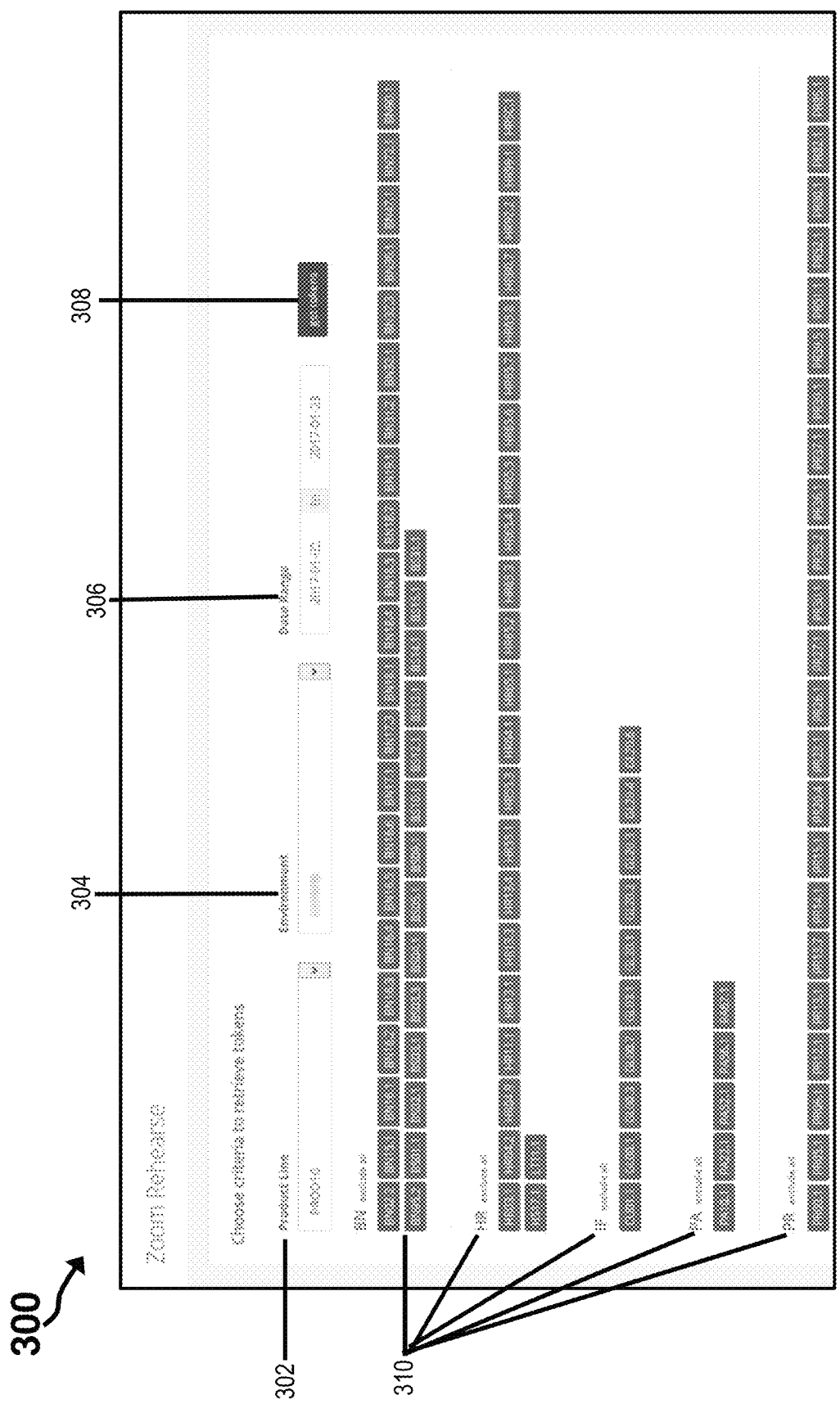
FIG. 3 shows a graphical user interface showing a dashboard, according to an exemplary embodiment.
Figure 4:
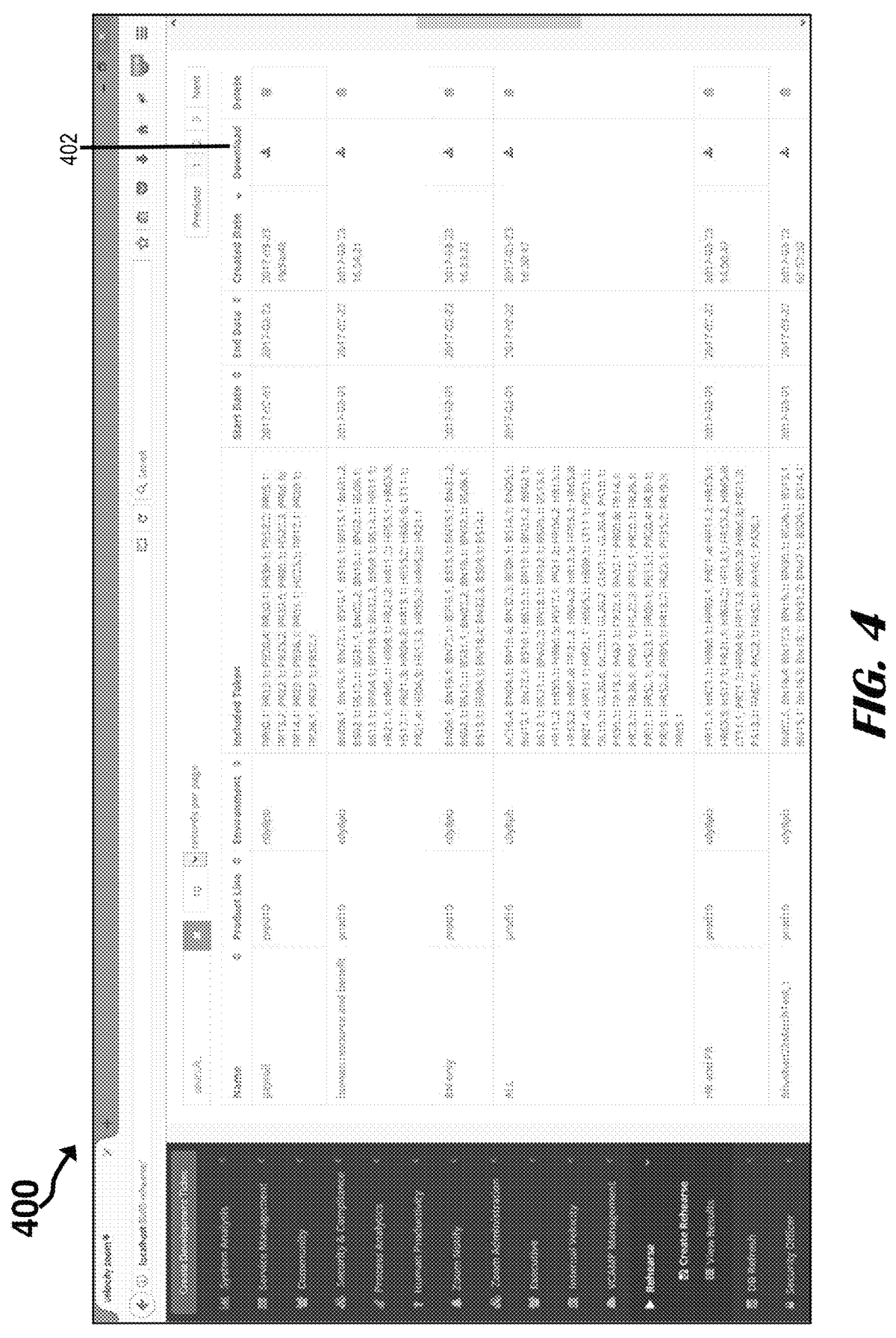
Figure 5:
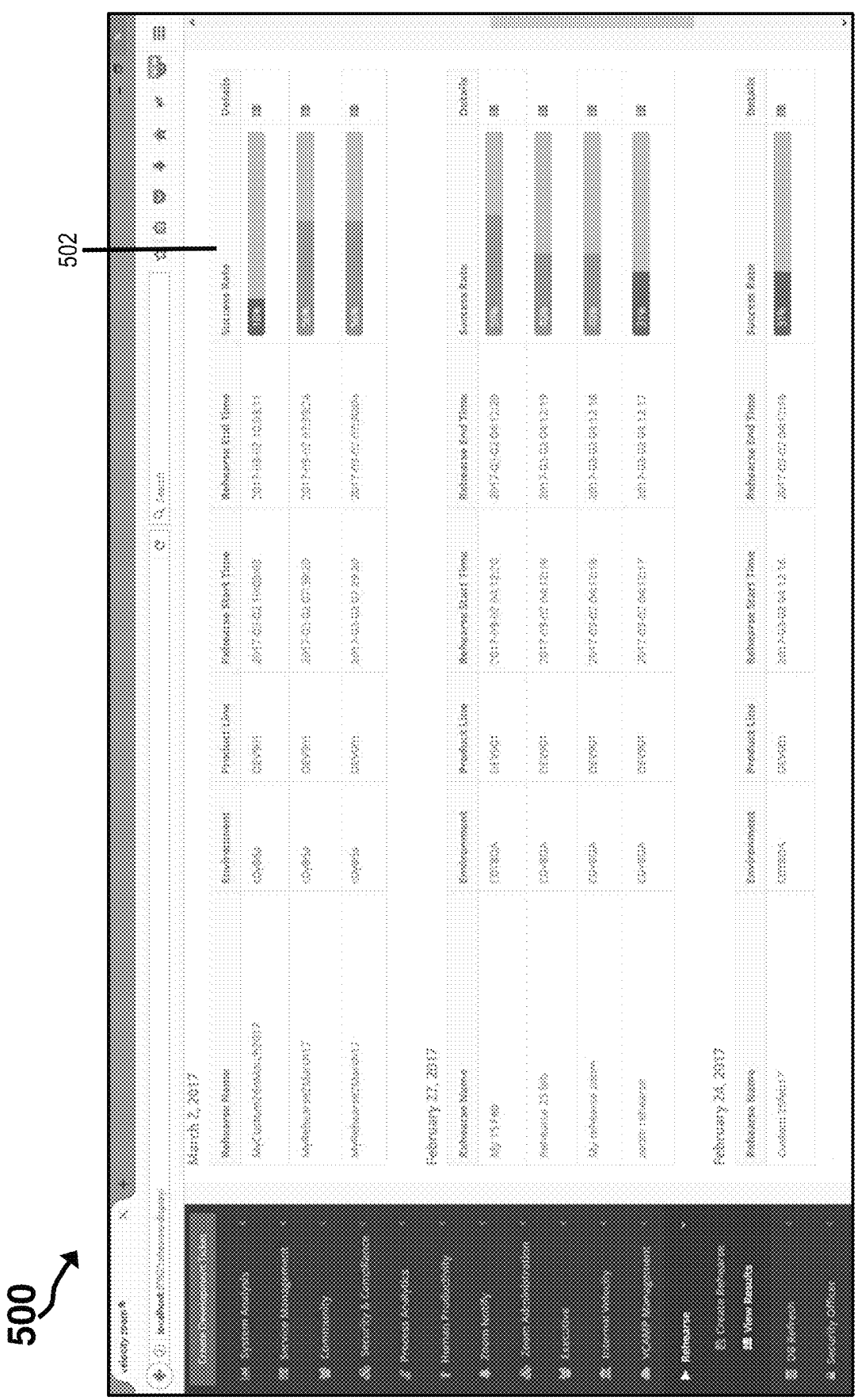
FIG. 5 shows a graphical user interface for displaying test results, according to an exemplary embodiment.

FIG. 3 shows a graphical user interface 300 showing a dashboard of a host entity according to an exemplary embodiment. Each of the panels 302, 304, 306, and 308 can be rearranged to a different position on the graphical user interface, and the panels 302, 304, 306, and 308 can be added or removed as desired. Each panel presents information about an aspect of the enterprise system that can be selected by a user to generate a test script in order to perform a test of applications and/or software operations of the client companies using the test script. For example, a user will select a product line 302, an environment 304, and date range 306 for generation of a test script. Upon the selection of the product line 302, the environment 304, and the date range 306, the user will then click on "get token" panel 308. The token results 310 may be presented to the user on the graphical user interface 300 upon selecting the "get token" panel 308, as shown in FIG. 3. The token results 310 are then used to generate a test script that includes the transactions information for a data set of a selected product line within the selected date range. For example, the token results 310 may include a list of forms for benefit module (BN), human resources module (HR), personnel actions module (PA), payroll module (PR), and so on that the employees have accessed within the selected data set in the selected date range. The test scrip is then downloaded by an administrator of a host system on administrator workstation using a download panel 402 as displayed on a graphical user interface 400 shown in FIG. 4. The administrator of a host system may then trigger a test server to perform the test using the test script. The test results 502 are then displayed on a graphical user interface 500 as shown in FIG. 5.

An exemplary method for utilizing the community information is as follows. A client computer system performs transactions and/or software operations (e.g., actions) in an enterprise system hosted by a host entity, such as in a cloud environment. The host entity stores datasets comprising field level data and metadata (e.g., response time, delay, processing time, usage) about the transactions and/or software operations in a database for the client computer system's actions and the actions of other client companies. The host entity uses the stored datasets to automatically generate test scripts and test software operations of the client companies using the test script. The results of the test are then presented to the client computer system regarding the performance of the software operations of the client computer system. The host entity may present a webpage to the client computer system that shows the client computer system software operations' performance based on the particular dataset.

In some embodiments, transactional datasets may be used to provide comparative analysis of system and user efficiency. Furthermore, by gathering datasets about the community's systems themselves (e.g., versions, patches), it is possible to provide additional comparative analysis for system and user performance across different versions. Further, by adding additional datasets about system changes and system events (i.e., monitors), additional comparative analysis can be provided. Examples of how a host entity can use datasets to compare the client company with others in the community include, but are not limited to, an ability to: (1) analyze on-line transactional usage for patterns/comparisons by system/transaction/function; (2) analyze batch system usage for patterns/comparisons by system/transaction/function; (3) analyze system performance metrics for patterns/comparisons by system/transaction/function; (4) analyze system level (version/upgrade/cyclical/patch) for patterns/comparisons by system/transaction/function; (5) analyze ad-hoc query usage/efficiency (and impact on overall system performance); (6) analyze user logins for patterns/comparisons by system/transaction/function; (7) analyze user session duration/habits for patterns/comparisons by system/transaction/function; (8) analyze user efficiencies for patterns/comparisons by system/transaction/function; (9) identify anomalous user behavior (i.e., users logging in from home @2:30 am); and (10) identify anomalous transaction and/or software operation behavior (i.e., daemon process that updates Accounts Payable Vendor terms before scheduled check runs and changes back after check run).

Figure 6:
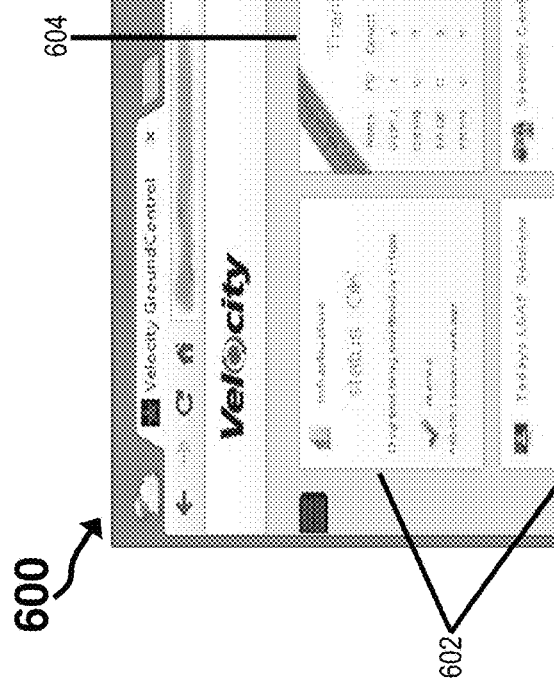
FIG. 6 shows a graphical user interface showing a dashboard according to an exemplary embodiment.

Non-limiting examples of types of presenting comparative performance information are further described in FIGS. 6-12 below. Referring to FIG. 6, a graphical user interface 600 showing a dashboard according to an exemplary embodiment. Each of the panels 602 can be rearranged to a different position on the graphical user interface, and the panels 602 can be added or removed as desired. By activating a button in the upper left corner, the user can expose additional options or panels. Each panel can present information about an aspect of the enterprise system to the client company. For example, one panel is entitled "Transactions" and includes community information. The transactions panel 604 shows the slowest running transactions and/or software operations in the last three days, which may be the transactions and/or software operations that require the most attention. Some enterprise systems may be running thousands of applications at a time, so it is useful to see which types of transactions and/or software operations take the most amount of time to complete.

Figure 7:
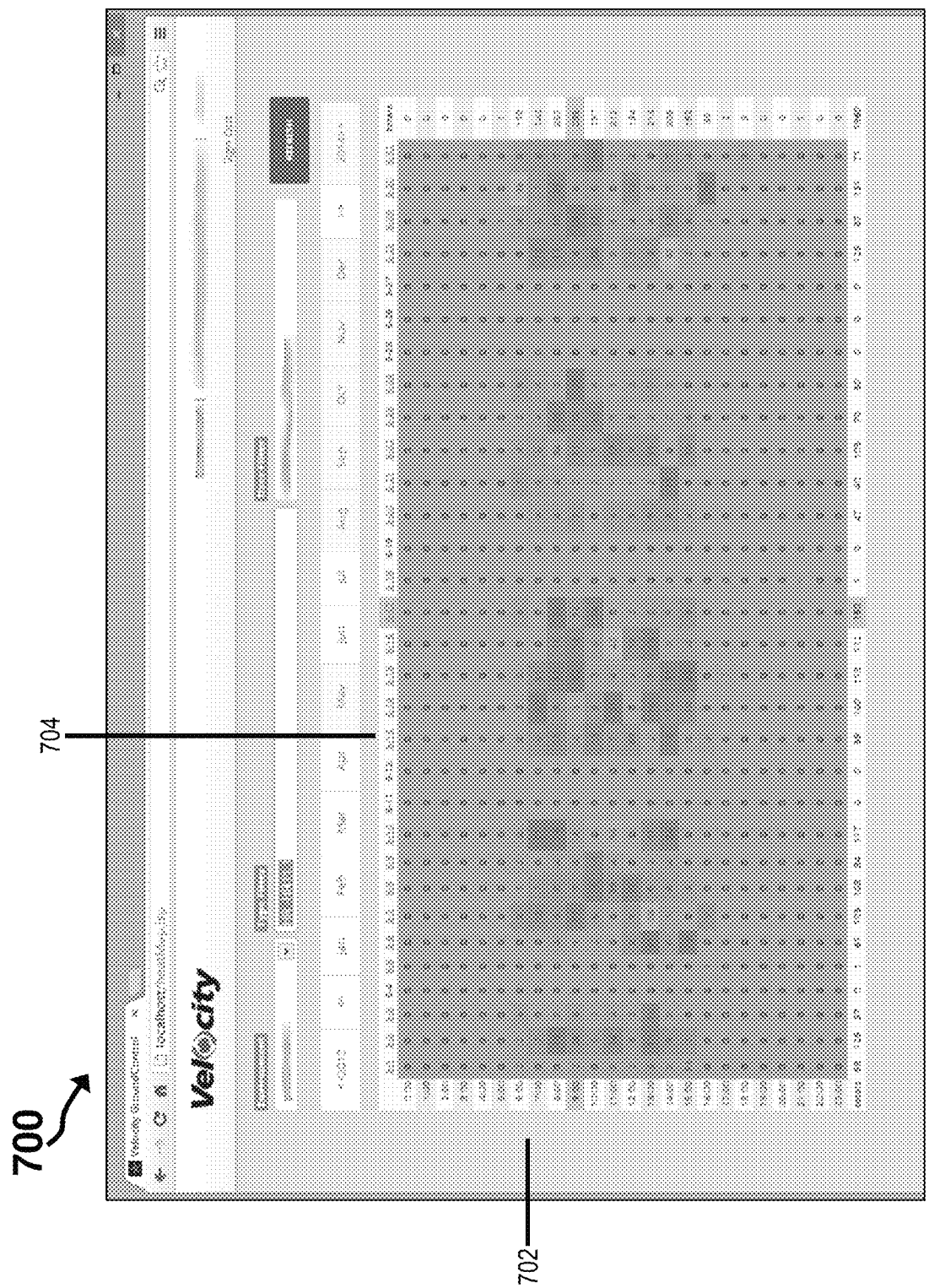
FIG. 7 shows a graphical user interface showing a heat map according to an exemplary embodiment.

Referring to FIG. 7, a graphical user interface 700 showing a heat map of usage is shown for the enterprise system. This heat map may be generated by clicking on a link for "Transaction Analysis" in a panel on a dashboard. The heat map shows usage by transaction and/or software operation count and response time. The left axis 702 represents a time of day, the top axis 704 represents a time of month, the right axis represents total hours, and the bottom axis represents total days. The number on the heat map represents a number of transactions and/or software operations. In this exemplary embodiment, the filter is HR but not HR11.1, referring to an Infor Lawson® human resources application. Although the exemplary embodiments may recite the use of an Oracle or Infor Lawson enterprise system, it is intended that any enterprise system may be used with the methods and systems described herein. As shown in this exemplary heat map, the 16th, 17th, and 30th days of the month are the most busy, and those days happen to coincide with payroll time. It may be useful for the client company to see how other similar businesses are performing during these periods, e.g., whether the number of transactions and/or software operations has been spread out or moved to a different part of the month.

Figure 8:
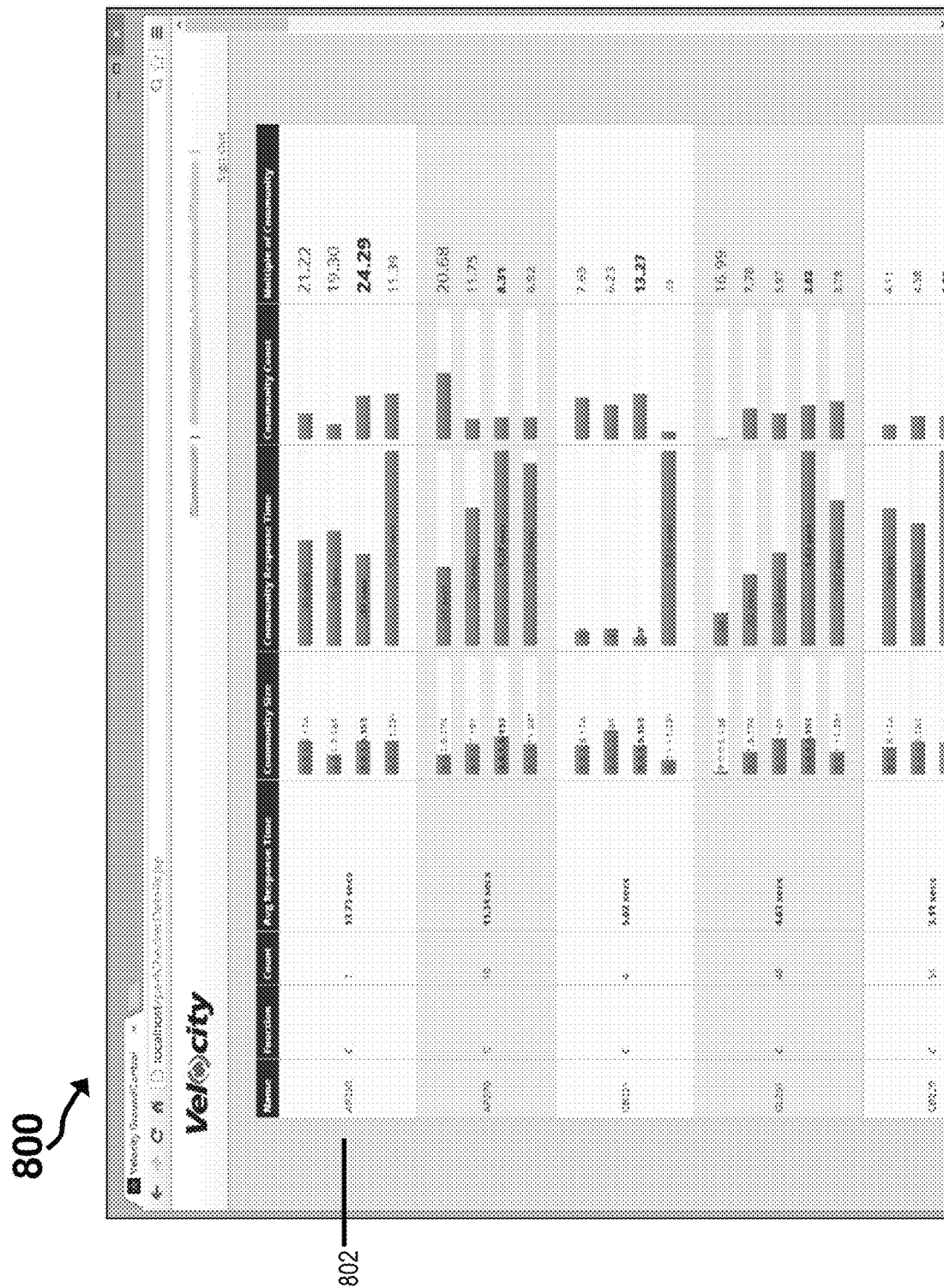
FIG. 8 shows a graphical user interface for comparing community information according to an exemplary embodiment.

Referring to FIG. 8, a graphical user interface 800 for comparing community information is shown according to an exemplary embodiment. This graphical user interface may be presented to the user upon selecting the "Transactions" panel, as shown in FIG. 6. As shown in the first row 802, the name AP230 refers to a particular application. Each row listed under "Community Size" includes a version number and a patch level, along with a corresponding volume. In some instances, different departments within a client company may use different versions or patch levels of the same application. In this example, the client company can observe that it is running the application 24.29 times slower than others using the same version. In another example, for GL291, there are five different versions running in the community, and version 174 is faster than version 153. This client company is running the application with an average response time of 4.03 seconds, which is slower than the slowest version of the application. So the client company may have inefficiencies in this version and may consider upgrading to a different version. This community comparison can provide data that allows the client company to evaluate their efficiencies and delays.

Figure 9:
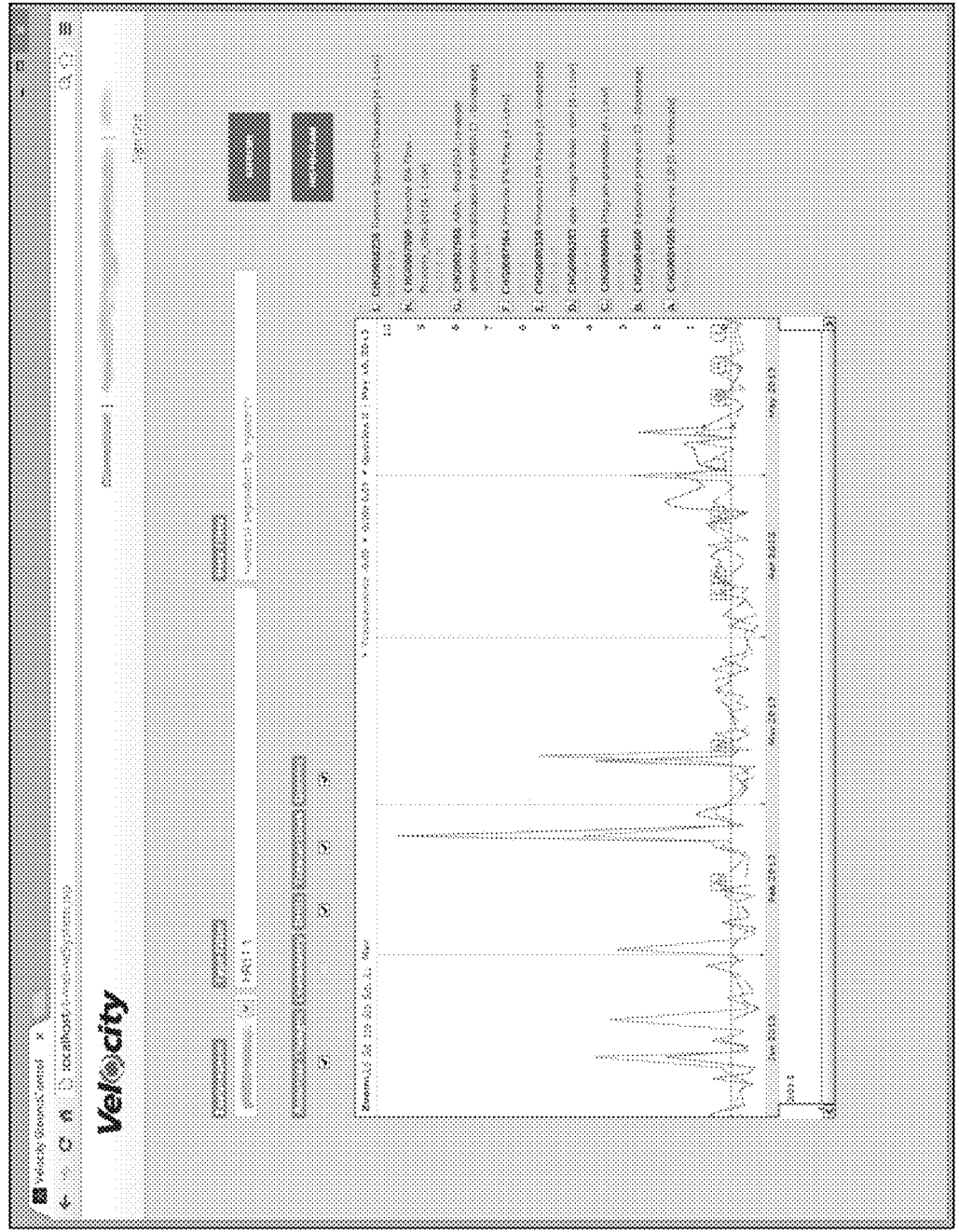
FIG. 9 shows a graphical user interface for displaying performance over time according to an exemplary embodiment.

Referring to FIG. 9, a graphical user interface 900 for displaying performance over time is shown according to an exemplary embodiment. The chart shows response time of transactions and/or software operations, drills, and queries over time. If a modification or change was made to the system, this chart can show how the modification or change affected performance. A filter (e.g., limiting to a certain application) can be used to see which jobs were running. "Drills" can represent a feature of an application where a user drills down into the data to see more information about the a transaction and/or software operation. "Queries" can represent a number of queries by users, some of whom may write improper queries that overwhelm the system. In this example, point "A" represents a time when the client company requested to recycle Lawson Business Intelligence (LBI). Point A is shown on the chart to see how performance was affected.

Figure 10:
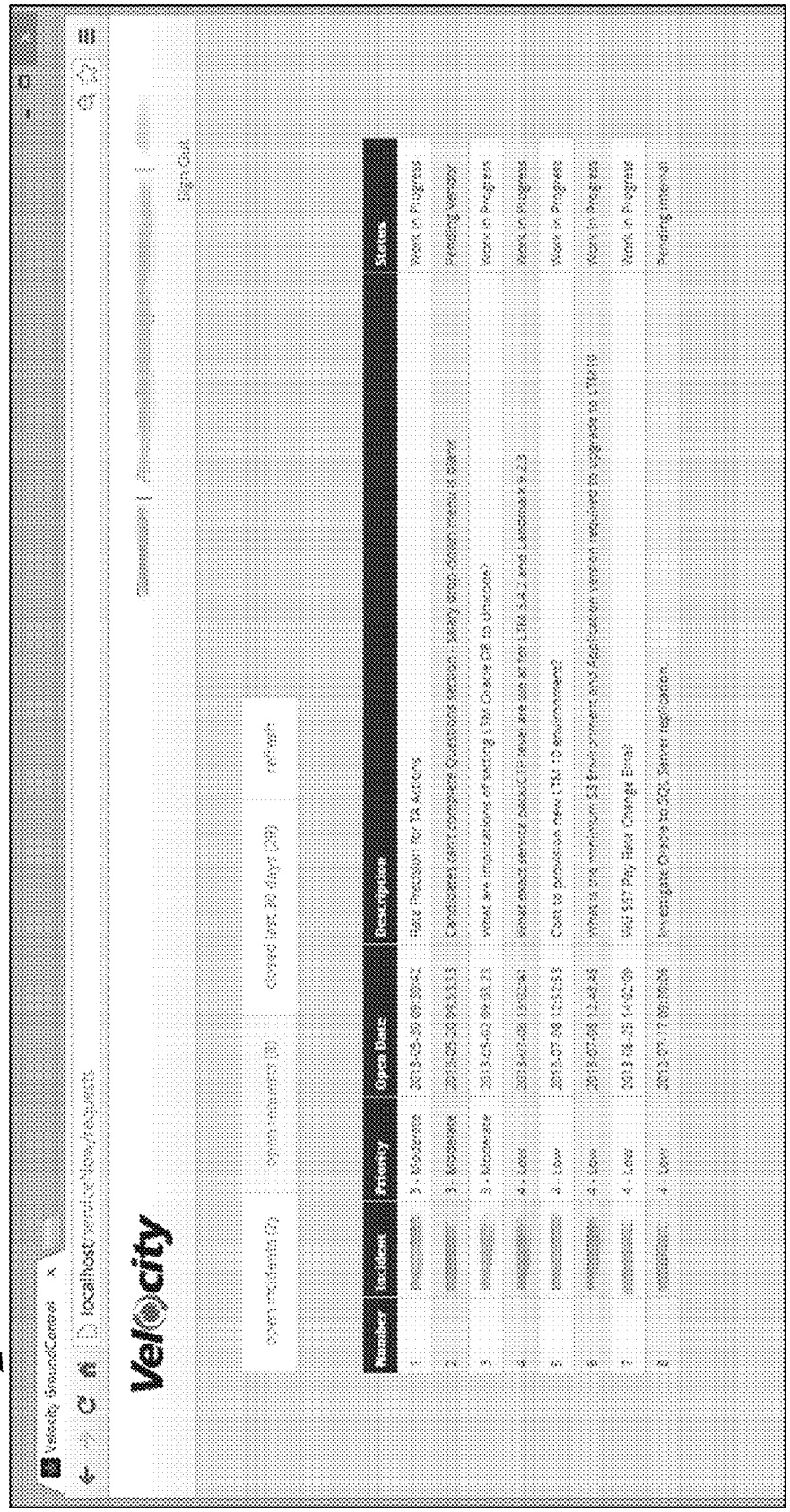
FIG. 10 shows a graphical user interface displaying open requests according to an exemplary embodiment.

Referring to FIG. 10, a graphical user interface 1000 displaying open requests is shown according to an exemplary embodiment. By selecting a panel for "Incidents & Requests," as shown in FIG. 3, a user can view a list of open incidents, open requests, and incidents and requests closed within the last 30 days.

Figure 11:
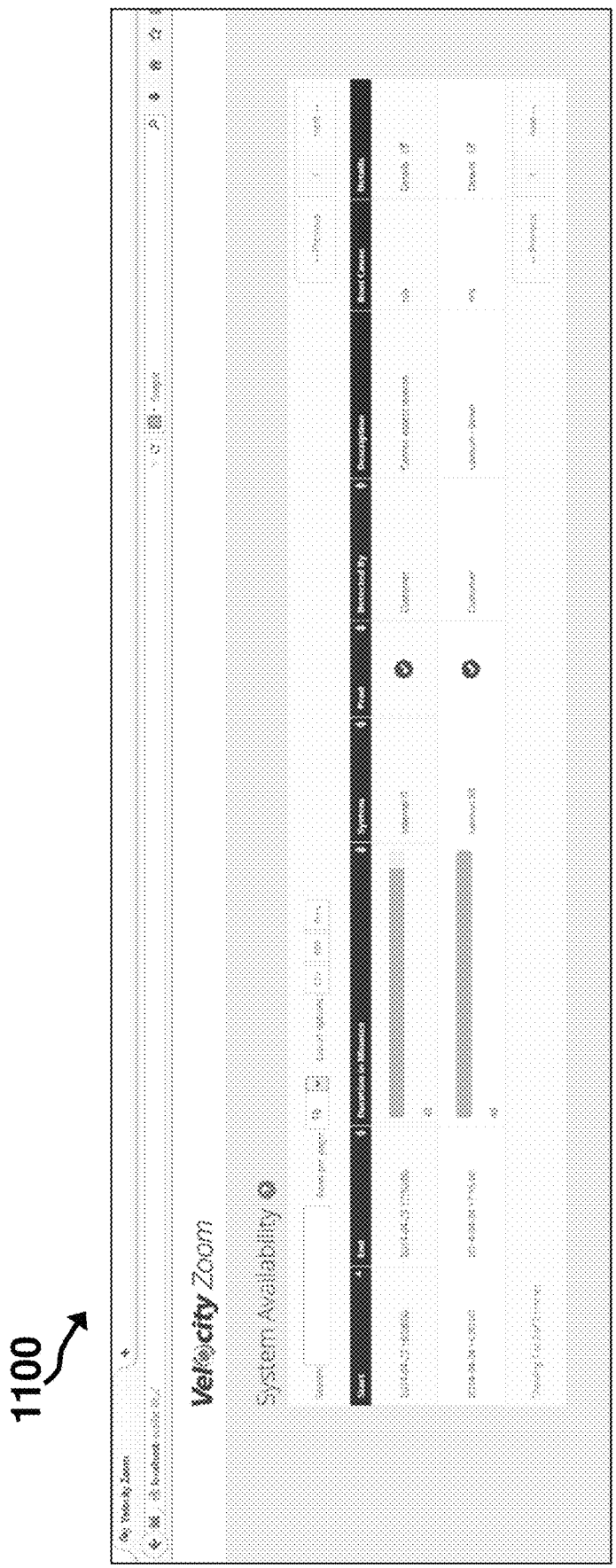
FIG. 11 shows a graphical user interface for displaying outages according to an exemplary embodiment.

Referring to FIG. 11, a graphical user interface 1100 for displaying outages is shown according to an exemplary embodiment. In this exemplary embodiment, the number of outages is shown since the installment of the system along with the duration of the outage. In some embodiments, there may also be a description as to the cause of an outage.

Figure 12:
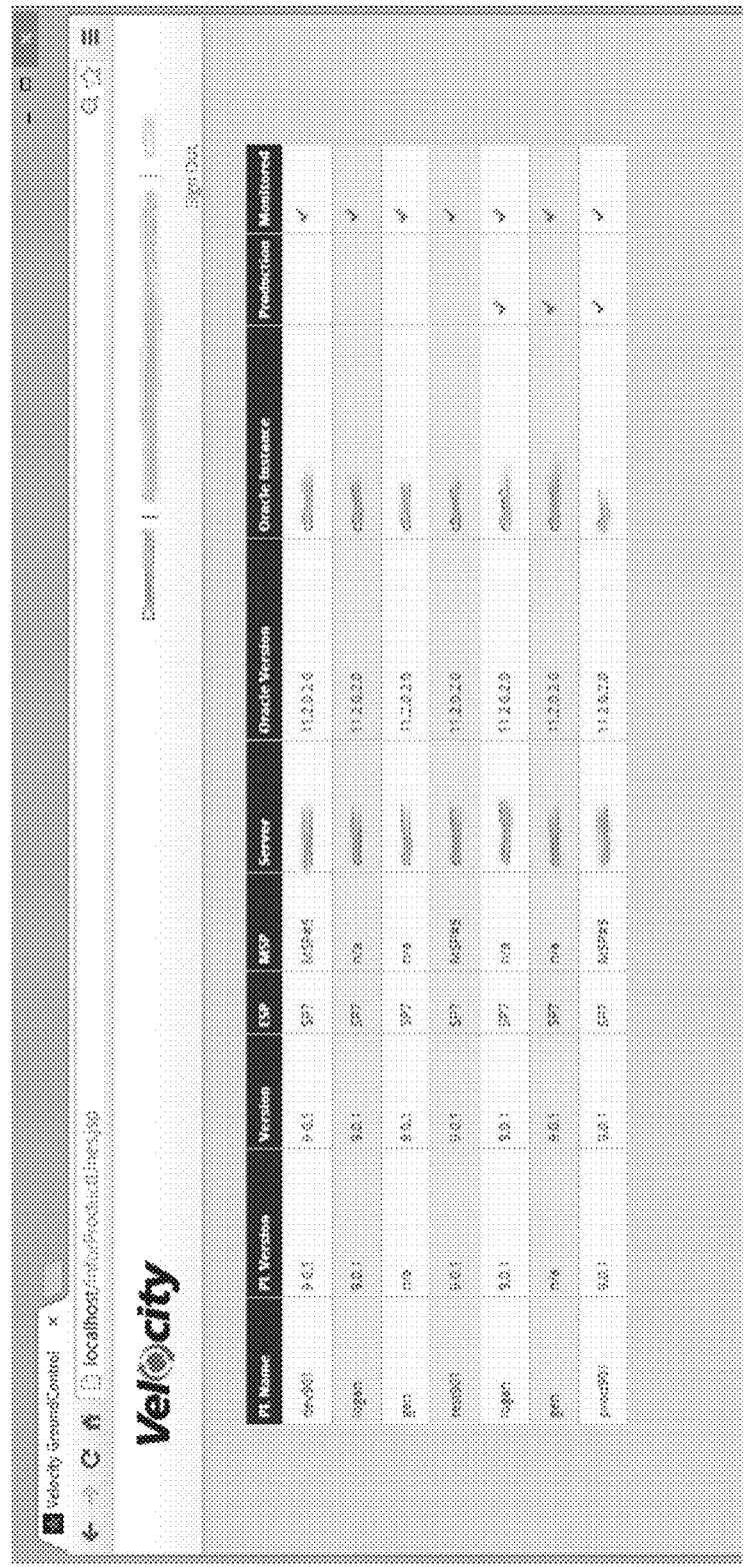
FIG. 12 shows a graphical user interface displaying one or more product lines for a client company according to an exemplary embodiment.

Referring to FIG. 12, a graphical user interface 1200 displaying one or more product lines for a client company is shown according to an exemplary embodiment. The graphical user interface may display information regarding development, testing, production, or training. This graphical user interface can give information to client company about the status of the system being hosted by the host entity.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A system comprising:
a communication network;
a client computer device configured to operate an enterprise resource planning system;
a communication server configured to:
receive, over the communication network from the client computer device, a first transmission comprising datasets based on actual user interactions, the datasets corresponding to at least a plurality of software operations of a first application in the enterprise resource planning system being operated by the client computer device, wherein each of the software operations is linked to at least one dataset; and
categorize the datasets relating to each software operation to one of a plurality of categories; and
a dashboard server configured to:
generate a test script for testing a second application using one or more data fields selected from the datasets corresponding to the first application for a first environment in a plurality of environments for a defined time-period, wherein one or more instructions are defined in the test script and the one or more instructions are loaded into a computer-readable memory; and
a test server configured to:
execute the test script to test the second application according to the one or more instructions defined in the test script, wherein executing the test script comprises retrieving the plurality of software operations corresponding to the plurality of categories of the first application during the defined time-period for the one or more selected data fields and performing the plurality of software operations of the first application during the defined time-period for the one or more selected data fields.

2. The system according to claim 1, wherein the communication server is further configured to transmit over the communication network to the client computer device, a second transmission comprising information for display of test performance of the plurality of the software operations of the second application based on the datasets corresponding to the first application in the enterprise resource planning system.

3. The system according to claim 1, wherein the datasets comprises metadata selected from a group consisting of a response time, a delay time, a processing time, and usage.

4. The system according to claim 1, further comprising a database coupled to the dashboard server over the communication network, and wherein the database is configured to store the datasets relating to each software operation to one of the plurality of categories.

5. The system according to claim 1, wherein the datasets comprises field level data, and wherein the field level data further comprises personal identifying information.

6. The system according to claim 1, wherein the dashboard server is further configured to select field values of the one or more data fields selected from the datasets based on one or more rules.

7. The system according to claim 6, wherein the one or more rules are defined based on definition of forms within the datasets and stored in a database.

8. The system according to claim 7, wherein the dashboard server is further configured to reconstruct a first dataset required to simulate an interaction of an employee operating the client computer device with the first application in the enterprise resource planning system based on the field values of the one or more data fields.

9. The system according to claim 8, wherein the dashboard server is further configured to generate the test script for a second application using the first dataset.

10. The system according to claim 9, wherein the test script comprises programmed code that automates a test case generated by reconstructing the first dataset within the datasets by calling subroutines or application programming interfaces exported by test automation frameworks.

11. A computer-implemented method comprising:
receiving, by a server over a communication network from a client computer device, a first transmission comprising datasets based on actual user interactions, the datasets corresponding to a plurality of software operations of a first application in an enterprise resource planning system being operated by the client computer device, wherein each of the software operations is linked to the at least one dataset,
categorizing, by the server, the datasets relating to each software operation to one of a plurality of categories;
generating, by the server, a test script for testing a second application using one or more data fields selected from the datasets corresponding to the first application for a first environment in a plurality of environments for a defined time-period, wherein one or more instructions are defined in the test script and the one or more instructions are loaded into a computer-readable memory; and
executing, by the server, the test script to test the second application according to the one or more instructions defined in the test script, wherein executing the test script comprises retrieving, by the server, the plurality of software operations corresponding to the plurality of categories of the first application during the defined time-period for the one or more selected data fields, and performing, by the server, the plurality of software operations of the first application during the defined time-period for the one or more selected data fields.

12. The computer-implemented method according to claim 11, further comprising:
transmitting, by the server over the communication network to the client computer device, a second transmission comprising information for display of test performance of the plurality of the software operations of the second application based on the datasets corresponding to the first application in the enterprise resource planning system.

13. The computer-implemented method according to claim 11, wherein the datasets comprises metadata selected from a group consisting of a response time, a delay time, a processing time, and usage.

14. The computer-implemented method according to claim 11, wherein the datasets relating to each software operation to one of the plurality of categories is stored in a database.

15. The computer-implemented method according to claim 11, wherein the datasets comprises field level data, and wherein the field level data further comprises personal identifying information.

16. The computer-implemented method according to claim 11, further comprising selecting, by the server, field values of the one or more data fields selected from the datasets based on one or more rules.

17. The computer-implemented method according to claim 16, wherein the one or more rules are defined based on definition of forms within the datasets and stored in a database.

18. The computer-implemented method according to claim 17, further comprising reconstructing, by the server, a first dataset required to simulate an interaction of an employee operating the client computer device with the first application in the enterprise resource planning system based on the field values of the one or more data fields.

19. The computer-implemented method according to claim 18, further comprising generating, by the server, the test script for a second application using the first dataset.

20. The computer-implemented method according to claim 19, wherein the test script comprises programmed code that automates a test case generated by reconstructing the first dataset within the datasets by calling subroutines or application programming interfaces exported by test automation frameworks.

* * * * *